Patented Jan. 30, 1945

2,368,393

UNITED STATES PATENT OFFICE 2,368,393

GELATIN

Clarence C. Zeigler, Chicago, Ill., assignor to Industrial Patents Corporation, Chicago, Ill., a corporation of Delaware No Drawing. Application August 24, 1940, Serial No. 354,091

10 Claims. (Cl. 260—118)

This invention relates to food products and has to do particularly with the manufacture of an edible gelatin suitable for the preparation of gelatin desserts.

In the manufacture of edible gelatins from fresh pork skins, for example, it is customary to quick cure the skins in an inorganic acid curing reagent, then to extract the gelatin from the cured skins with hot water and finally to recover the gelatin from the water solution. The gelatin prepared in this manner is relatively slow setting and is unsuitable for the preparation of gelatin desserts without the addition of a reagent to accelerate setting.

It is desirable that a gelatin dessert be fairly quick setting, so that the product can be prepared for immediate consumption. Thus an ordinary gelatin dessert is dissolved in warm water, and on cooling sets up quickly. In order to speed up the setting time of gelatin used in desserts, several methods have been devised.

One method used particularly in connection with the long time lime curing method has been to carry a buffer salt through the normal gelatin manufacturing operation. The gelatin produced in this manner carries a pH value of about 6.0 and sets up rapidly. This method, however, is undesirable because the gelatin has a high ash content of around 1½ to 2 per cent. Also it is expensive on account of the high loss in buffer salt during the gelatin washing operations.

Another method, disclosed in U. S. Patent 2,024,683, comprises the addition of certain organic acids, which promote setting, to the curing reagent. According to this process, citric or tartaric acid, or a mixture thereof, with an inorganic acid, is used for curing operation. This method, however, is expensive because of the high cost of organic acids consumed and lost in the process.

It has also been proposed to add a buffer salt such as salts of citric or tartaric acids during the process of manufacturing a gelatin dessert, as disclosed in U. S. Patent 2,196,146. These buffer salts, of course, increase the cost of the dessert, and the addition thereof to obtain a uniform physical mixture is difficult.

It has now been found that an improved process of manufacturing gelatin for gelatin desserts comprises the incorporation of a buffer salt to the gelatin during the gelatin manufacturing operation. An advantageous point in the process to incorporate the buffer salt is just before the final filtration of the solution. In this way a clear, concentrated solution, which may be cooled and dried, is obtainable.

While a buffer salt per se, such as sodium or potassium citrate or tartrate, may be used, I prefer to form the buffer salt in the gelatin solution by the addition of an alkaline material and an organic acid. In this manner the pH of the solution and the amount of buffer salt content can be carefully controlled. Also the buffer salt is thoroughly mixed in the solution and a homogeneous, dry gelatin mixture obtained as the final product.

In practicing the invention, a gelatin stock, such as fresh pork skins, is treated with a suitable curing reagent. It has been found that a dilute acid solution; for example, hydrochloric or phosphoric acid, is advantageous, since the curing time is greatly reduced as compared with a long time lime cure. The cured product is washed several times with water, and is then transferred to cooking kettles wherein the skins are extracted with hot water. The resulting gelatin solution is filtered and the filtrate run to an evaporator. When the solution has been evaporated sufficiently, a buffer salt is added, or preferably formed in situ therein, by adding a suitable alkali and a suitable organic acid. The solution is then filtered and the filtered solution passed to a chilling machine wherein it is chilled to a gel. The gel is then dried and the dried product crushed and milled.

For purposes of illustration, an example will now be given of the operation of the invention, although it is to be understood that the invention is not limited to this example.

A good grade of fresh pork skins is subjected to a curing operation by treating the defatted skins for about 16 hours in a solution of about 0.17% hydrochloric acid. The cured stock is washed with three changes of water, each change being on about eight hours. The water is drained off from the skins, which have increased in weight about 100%.

The skins are next transferred to cooking kettles wherein they are extracted about four to six times with hot water. The resulting gelatin extract is filtered to produce a clear liquor containing about 2 to 4 per cent gelatin and having a pH value of about 4.0. The gelatin liquor is then subjected to evaporation, preferably under vacuum, to concentrate the solution to about 10% solids.

At this point citric acid is added in amount depending on solid content. It has been found that about 1% citric acid, based upon the solid content is satisfactory. The solid content may be determined by measuring the gravity and calculating the solids. The citric acid may be added as a concentrated aqueous solution.

An alkali solution is now added in sufficient amount to produce a pH value of about 5.0. Sodium or potassium hydroxide may be used, although I prefer to add liquid ammonia. The alkali solution is preferably added automatically to maintain a constant pH value. The resulting solution is then passed to a heavy liquor filter, wherein it is given a final filtration.

From the latter filter, the clear solution is chilled to about 40 to 50 degrees F. by passing it on a belt through a chilling tunnel maintained at about 18 to 25 degrees F. The product is withdrawn as a sheet of gel which is removed from the belt and placed on drying nets. The gel is subjected to drying by contact with warm air for about 20 to 30 hours. The dried sheets from the dryers contain about 90% solids. The sheets are finally passed through a crusher and a mill.

The product produced as above described shows an ash content of about 0.3 to 0.5 per cent and a salt content of about 1½ per cent. The product sets up in about eight to twelve minutes as compared with the time of 25 to 30 minutes by the old method.

The addition of the buffer salt during the manufacture has the advantage that the salt is not washed out and the salt content is more concentrated and more uniformly distributed. Also the pH value can be more accurately controlled to obtain good filtration. For example, if the pH runs substantially above 5.0, it is impossible to clarify the solution for filtration.

Furthermore, the addition of the buffer salt at an intermediate point in the process is more economical because there is substantially no loss, since the washing operations are already completed. Also the addition of the salt to the liquor, after evaporation takes place, decreases much of the load on the evaporators.

I prefer to use ammonia as the alkalyzing agent, because it produces ammonia citrate as the buffer salt. This salt is volatile at temperatures ordinarily used for the ash determination and therefore shows a low ash content. Thus a gelatin containing 1½% ammonium citrate will show an ash content of only about 0.3 to 0.5 per cent by the usual analytical method.

Obviously many modifications and variations of the invention as hereinbefore set forth may be made without departure from the spirit and scope thereof, and therefore only such limitations should be imposed as are indicated in the appended claims.

I claim:

1. A process for the manufacture of gelatin from aqueous solutions thereof which comprises concentrating the solution, incorporating in the concentrated solution a buffer salt selected from the class consisting of sodium, potassium and ammonium salts of citric and tartaric acids, filtering the mixture and recovering the modified gelatin product therefrom.

2. A process for the manufacture of gelatin from aqueous solutions thereof which comprises evaporating the solution to a concentration at which it sets on cooling, adding thereto an organic acid selected from the class consisting of citric and tartaric acids and an alkali selected from the class consisting of sodium, potassium and ammonium hydroxides thereby forming a buffer salt, filtering the resulting solution, chilling the solution to form a gel and drying the gel.

3. A process for the manufacture of gelatin from concentrated aqueous solutions thereof, which comprises incorporating in said concentrated aqueous solution of gelatin ammonium citrate, filtering the solution and recovering the modified gelatin solids therefrom.

4. A process for the manufacture of gelatin from dilute aqueous solutions thereof which comprises concentrating the solution to about 10 per cent solids, adding to the concentrated solution about 1 per cent based on the solids of an organic acid selected from the group consisting of citric and tartaric acids, substantially neutralizing the acid with an alkali selected from the class consisting of sodium, potassium and ammonium hydroxides, filtering the resulting solution and recovering the modified gelatin solids therefrom.

5. A process for the manufacture of gelatin from concentrated aqueous solutions thereof which comprises adjusting the solution to a pH value of about 5 by forming in situ therein a buffer salt selected from the group consisting of sodium, potassium and ammonium salts of citric and tartaric acids by adding the acidic and basic components of the salt to the solution, filtering the solution and recovering the modified gelatin solids therefrom.

6. A process for the manufacture of gelatin from pork skins which comprises curing the skins, extracting the gelatin from the skins with water, concentrating the resulting solution to a consistency whereby the solution gels on cooling, adding a substantial amount of an organic acid selected from the group consisting of citric and tartaric acids, neutralizing the solution to a pH of about 5 by the addition of an alkali selected from the class consisting of sodium, potassium and ammonium hydroxides, filtering the resulting solution and recovering the modified gelatin solids therefrom.

7. A process for the manufacture of gelatin from pork skins which comprises acid curing the skins, extracting the gelatin from the cured skins with water, concentrating the resulting solution to about 10 per cent solids, adding to the concentrated solution about 1 per cent based on the solids content of an organic acid selected from the group consisting of citric and tartaric acids, adjusting the pH of the solution to about 5 by the addition of an alkali selected from the group consisting of sodium, potassium and ammonium hydroxides, filtering the solution and recovering the modified gelatin solids therefrom.

8. A process for the manufacture of gelatin of low ash content from gelatin stock, which comprises curing the stock, extracting the gelatin to produce a dilute aqueous solution thereof, concentrating the solution to about 10% solids, adding about 1% citric acid based on the solids, adjusting the pH value of the solution to about 5.0 by the addition of ammonia, filtering the solution and recovering the modified gelatin product from the filtered solution.

9. A process for the manufacture of gelatin from solutions thereof, which comprises concentrating the solution, incorporating therein sodium citrate, filtering the solution and recovering the modified gelatin solids therefrom.

10. A process for the manufacture of gelatin from aqueous solutions thereof, which comprises concentrating the solution, incorporating therein ammonium tartrate, filtering the solution and recovering the modified gelatin solids therefrom.

CLARENCE C. ZEIGLER.